(12) United States Patent
Matsuzawa et al.

(10) Patent No.: US 6,640,650 B2
(45) Date of Patent: Nov. 4, 2003

(54) FLOW RATE SENSOR

(75) Inventors: Hironori Matsuzawa, Aichi (JP); Tomoko Shibata, Aichi (JP)

(73) Assignee: Advance Denki Kougyou Kabushiki Kaisha, Aichi (JP)

( * ) Notice: Subject to any disclaimer, the term of this patent is extended or adjusted under 35 U.S.C. 154(b) by 0 days.

(21) Appl. No.: 10/368,376

(22) Filed: Feb. 20, 2003

(65) Prior Publication Data

US 2003/0172744 A1 Sep. 18, 2003

(30) Foreign Application Priority Data

Mar. 12, 2002 (JP) ........................................ 2002-066722
Dec. 10, 2002 (JP) ........................................ 2002-358342

(51) Int. Cl.$^7$ ................................................ G01F 1/38
(52) U.S. Cl. ...................................... 73/861.47; 73/716
(58) Field of Search ........................ 73/861.47, 861.42, 73/861.52, 715, 716, 720, 756, 736

(56) References Cited

U.S. PATENT DOCUMENTS 5,796,007 A * 8/1998 Panagotopulos et al. ...... 73/716
5,861,561 A * 1/1999 Van Cleve et al. ...... 73/861.52
6,550,337 B1 * 4/2003 Wagner et al. ................ 73/715

* cited by examiner

Primary Examiner—Edward Lefkowitz
Assistant Examiner—Corey D. Mack
(74) Attorney, Agent, or Firm—Rader, Fishman & Grauer PLLC

(57) ABSTRACT

A flow rate sensor high in pressure resistance has a structure to facilitate the measurement of a minuscule differential pressure for measurement of a very small flow rate. A chamber (20) is defined into a primary chamber (21) and a secondary chamber (25) by two diaphragms (31, 32) arranged in an opposed relation to each other. A fluid is passed from the primary chamber to the secondary chamber through a bypass (35) having an orifice portion (40) thereby to generate a differential pressure. The load generated by the fluid pressure fluctuations received by the first and second diaphragms is detected as a difference of displacement by a load difference sensor (50) arranged between the first and second diaphragms thereby to detect the flow rate of the fluid. Displacement limiting members (61, 62) are provided for the diaphragms or the load difference sensor so that the displacement due to the fluid pressure fluctuations received by the first and second diaphragms may not exceed a predetermined amount.

7 Claims, 9 Drawing Sheets

FLOW RATE SENSOR

BACKGROUND OF THE INVENTION

1. Field of the Invention

The present invention relates to a sensor for measuring the flow rate of a fluid or, in particular, to a flow rate sensor employing a diaphragm.

2. Description of the Related Art

As a means for measuring the flow rate of a fluid, a system in which the pressure of each of two pressure sensors arranged with an orifice held therebetween is calculated, is generally known. This system, however, poses a great problem in respect to sensitivity and pressure resistance. Specifically, in the case where the portion of the system downstream of the flow rate sensor is closed, a large pressure is imposed and, therefore, a pressure sensor having a high pressure resistance is required, resulting in a lower sensitivity. Also, the use of two sensors leads to different drift characteristics (temperature, source voltage, etc.) due to the individual differences of the pressure sensors, which in turn poses the problem that correction and the zero adjustment, after a calculation, are frequently required.

In view of this, the present inventor previously proposed, in U.S. Pat. No. 3,184,126, a flow rate sensor used for ultra pure water and chemical liquids which are used, for example, in the semiconductor manufacturing process. This flow rate sensor comprises a first diaphragm and a second diaphragm for defining a primary chamber and a secondary chamber which are connected by a bypass with an orifice interposed therein, wherein the displacement generated by the pressure fluctuations of the fluid received by the first and second diaphragms is detected by a strain gauge.

The patented system described has several great advantages. For example, it does not have any movable member (such as an impeller or a float) for detecting the flow rate in the flow path of the fluid to be measured, and therefore no fine dust (particles) is generated. Thus, the system can be most suitably used for measuring the ultra-pure water or chemical liquids. In addition, the flow rate change can be detected directly as an electrical signal, thereby making it possible control the subsequent operation easily. Especially, in view of the fact that an orifice (portion) is interposed in the bypass, the diameter of the orifice can be set arbitrarily and minimized for detecting a very small flow rate. Also, the orifice, if formed as an independent member, can be replaced freely in accordance with the diameter thereof.

In the structure of the patented invention described above, however, the sensitivity of the load difference sensor (strain gauge) must be improved for measuring a fine differential pressure in respect of the flow rate. Reducing the thickness of the movable member of the load difference sensor for improving the sensitivity thereof, however, would erroneously exert a high pressure on the primary or secondary side. Also, in the case where an excessive flow rate exceeds the measurable range, the limit of elasticity of the movable member of the load difference sensor is exceeded, thereby damaging the movable member or making it impossible to restore the zero point. Increasing the pressure resistance of the movable member of the load difference sensor, on the other hand, would reduce the sensitivity against the differential pressure in respect of the flow rate, with the result that a wide range of the measurement ability of the flowmeter cannot be secured. Thus, the accuracy would be adversely affected without allowing a large pressure loss in the chamber by reducing the orifice diameter or otherwise.

SUMMARY OF THE INVENTION

In view of the situation described above, the object of the present invention is to provide a novel structure of a flow rate sensor which has a high pressure resistance while at the same time facilitating the measurement of the differential pressure for measurement of a very small flow rate.

According to a first aspect of the invention, there is provided a flow rate sensor comprising a chamber with first and second diaphragms arranged therein in opposed relation to each other, wherein the chamber is divided into a primary chamber facing the first diaphragm and a secondary chamber facing the second diaphragm, wherein a fluid is passed from the primary chamber to the secondary chamber through a bypass having an orifice member thereby to generate a differential pressure between the primary chamber and the secondary chamber, wherein the load difference generated by the fluid pressure fluctuations received by the first diaphragm and the second diaphragm is detected as a displacement by a load difference sensor arranged between the first diaphragm and the second diaphragm thereby to detect the flow rate of the fluid, and wherein a selected one of the diaphragm pair and the load difference sensor includes at least a displacement limiting member for preventing the displacement generated by the fluid pressure fluctuations received by the diaphragms from increasing beyond a predetermined amount.

According to a second aspect of the invention, there is provided a flow rate sensor of the first aspect, wherein the load difference sensor includes, fixedly arranged in the chamber, an outer peripheral frame member, a central member arranged at the central portion of the chamber, and a deforming portion, with a measuring portion, extending between the outer peripheral frame member and the central member, and wherein a pressure receiving portion for receiving the pressure of each of the diaphragms and transmitting the load thereof is mounted on the central member of the load difference sensor.

According to a third aspect of the invention, there is provided a flow rate sensor of the second aspect, wherein the displacement limiting member is arranged inside each of the pressure receiving portions.

According to a fourth aspect of the invention, there is provided a flow rate sensor of the second or third aspect, wherein a protective diaphragm portion is formed outside the deforming portion having the measuring portion of the load difference sensor.

According to a fifth aspect of the invention, there is provided a flow rate sensor of the second or third aspect, wherein the load difference sensor includes two deforming portions formed in opposed relation to each other and a measuring portion is arranged inside each of the deforming portions.

Further, according to a sixth aspect of the invention, there is provided a flow rate sensor of the first aspect, wherein an inlet portion and an outlet portion for the purge gas in communication with the space adjacent to the back sides of said diaphragms is arranged in the body of said flow rate sensor, and the permeative gas existing in the space adjacent to the back sides of said diaphragms is discharged outside together with the purge gas passing therethrough.

Furthermore, according to a seventh aspect of the invention, there is provided a flow rate sensor of the sixth aspect, wherein means for detecting the gas concentration or the liquid leakage is arranged in the piping system on the outlet portion side of said purge gas.

DESCRIPTION OF PREFERRED EMBODIMENTS

Figure 1:
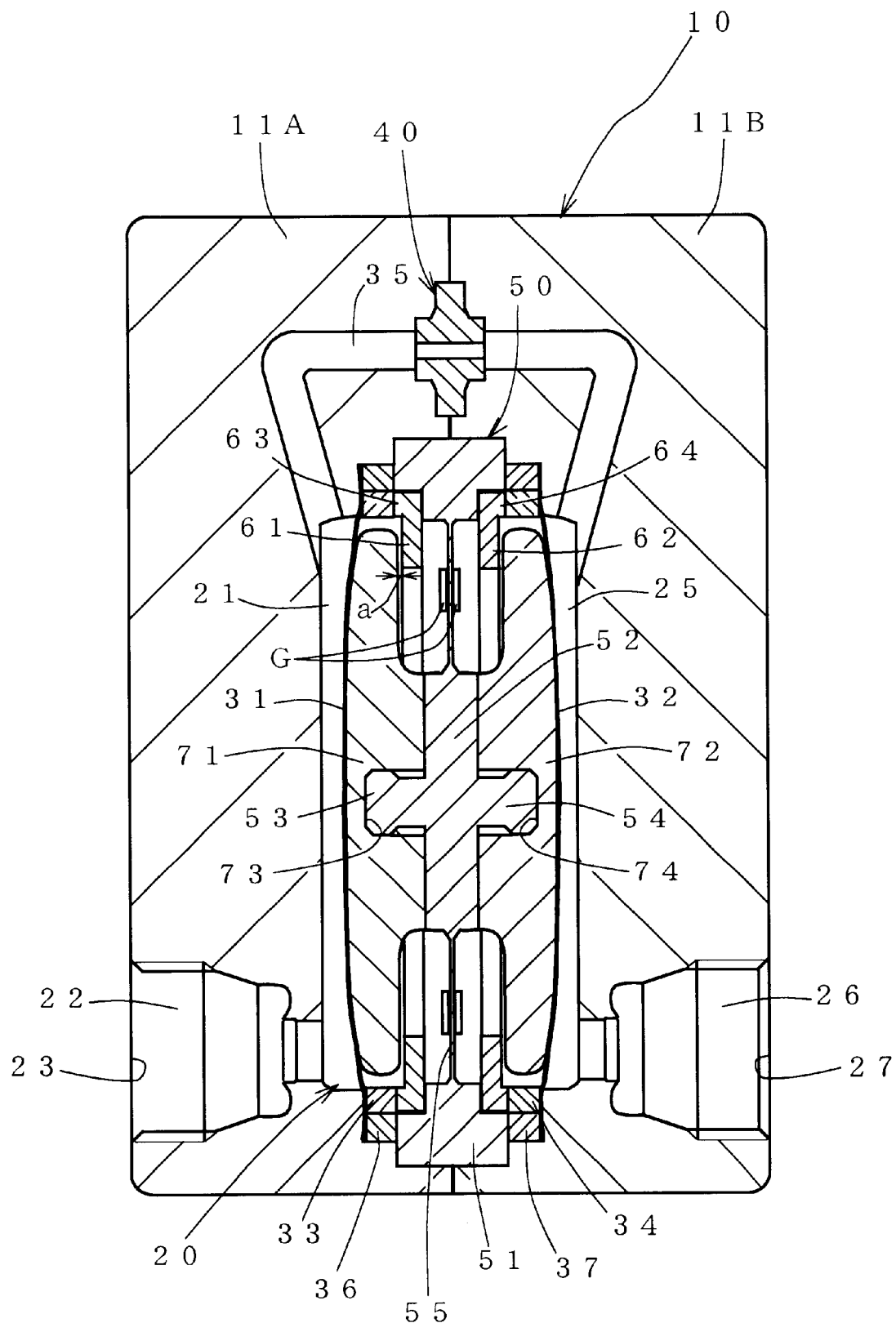
FIG. 1 is a longitudinal sectional view of the whole of a flow rate sensor according to an embodiment of the invention.
Figure 2:
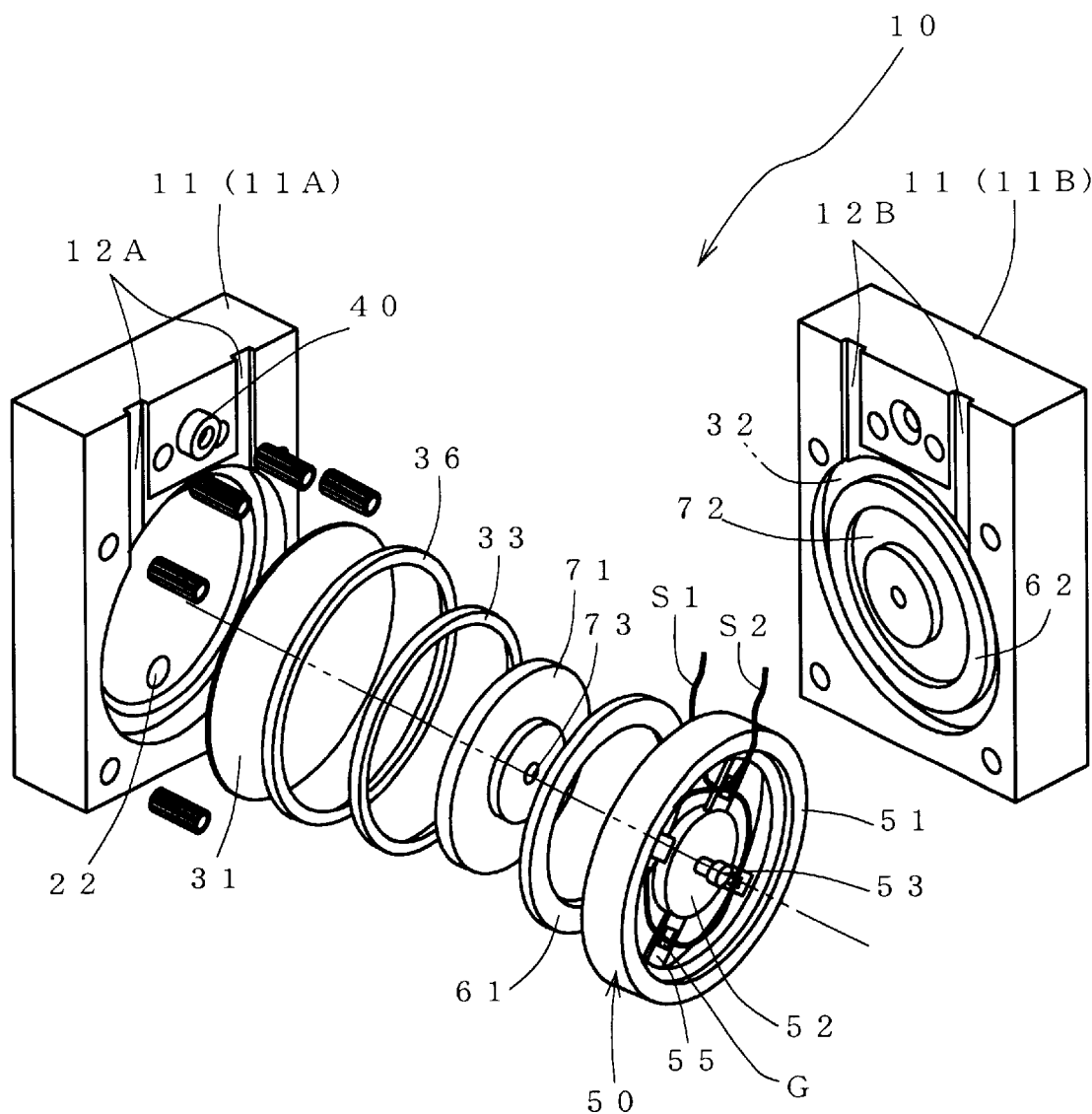
FIG. 2 is an exploded perspective view of a flow rate sensor.
Figure 3:
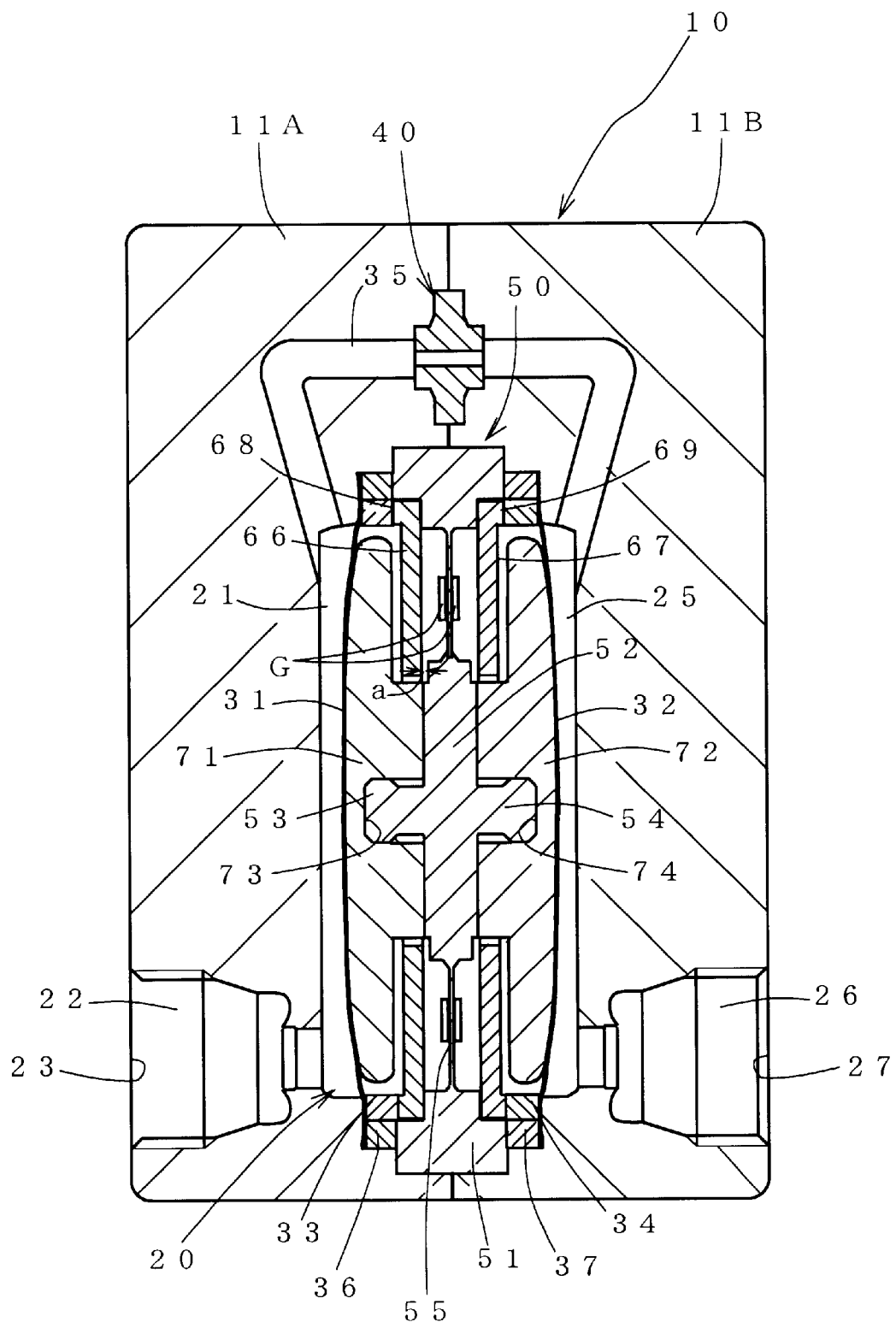
FIG. 3 is a longitudinal sectional view of a load difference sensor having displacement limiting members according to the embodiment shown in FIG. 1.

As shown in FIGS. 1 to 3, a flow rate sensor 10 according to the invention is used for measuring a very small flow rate of ultrahigh pure water or chemical liquids as described above. Two diaphragms, i.e. a first diaphragm 31 and a second diaphragm 32 receive the pressure fluctuations of the fluid passing through a chamber 20. The load difference between the first and second diaphragms 31, 32 is detected by a load difference sensor 50 as an amount of displacement thereby to detect the flow rate of the fluid.

Especially, the flow rate sensor 10 according to the invention has the feature in that the diaphragms 31, 32 (FIGS. 1, 2) or the load difference sensor 50 (FIG. 3) include displacement limiting members 61, 62 (FIGS. 1, 2), 66, 67 (FIG. 3), respectively, in order that the displacement generated by the fluid pressure fluctuations received by the first diaphragm 31 and the second diaphragm 32 may not exceed a predetermined amount. The displacement limiting members is not necessarily provided for the fluid pressure fluctuations on both the primary and secondary sides, but may be provided for the fluid pressure fluctuations on only one side (normally, the primary side).

The chamber 20, as shown, is defined into a primary chamber 21 facing the first diaphragm 31 and a secondary chamber 25 facing the second diaphragm 32 by the same two diaphragms, i.e. the first and second diaphragms 31, 32, arranged in an opposed relation to each other in the chamber 20. A fluid having a differential pressure is passed from the primary chamber 21 to the secondary chamber 25 through a bypass 35 having an orifice portion 40. The chamber 20 includes a fluid inflow portion 22 having an entrance 23 open to one side (primary chamber 21) and a fluid outflow portion 26 having an exit 27 open to the other side (secondary chamber 25).

According to this embodiment, the first diaphragm 31 and the second diaphragm 32 are formed of fluororesin such as polytetrafluoroethylene (PTFE resin) having a superior corrosion resistance. In the drawings, reference numerals 33, 34 designate inner peripheral holding rings for fixing the first diaphragm 31 and the second diaphragm 32, respectively, and numerals 35, 36 designate outer peripheral holding rings having similar functions.

According to the invention, displacement limiting members 61, 62, 66, 67 are arranged on the diaphragms 31, 32 or the load difference sensor 50 in order that the displacement of the first diaphragm 31 and the second diaphragm 32 generated by the fluid pressure fluctuations applied thereto may not exceed a predetermined amount. In the embodiment shown in FIGS. 1 and 2, the displacement limiting members 61, 62 are provided for the first and second diaphragms 31, 32, respectively, while in the embodiment shown in FIG. 3, the displacement limiting members 66, 67 are arranged for the load difference sensor 50. In FIG. 3, the reference numerals identical to those of FIGS. 1 and 2 designate the same component parts, respectively, as the corresponding ones in FIGS. 1 and 2.

First, the embodiment shown in FIGS. 1 and 2 will be explained. The displacement limiting members 61, 62 are provided for the diaphragms 31, 32, respectively. Especially, in this example, the displacement limiting members 61, 62 are arranged inside the pressure receiving portions 71, 72 for receiving the pressure of the diaphragms 31, 32 and transmitting the load thereof.

Specifically, as described with reference to the invention of the second aspect, the example under consideration is such that the load difference sensor 50 includes an outer peripheral frame portion 51 fixedly arranged in the chamber 20, a central member 52 arranged at the central portion and a deforming portion 55 extending between the outer peripheral frame portion 51 and the central member 52 and having a measuring portion G. The pressure receiving portions 71, 72 for receiving the pressure of the diaphragms 31, 32 and transmitting the load thereof are mounted on the central member 52 of the load difference sensor 50. Numerals 53, 54 designate coupling protrusions formed for mounting the pressure receiving portions 71, 72 integrally on the central member 52 of the load difference sensor 50.

Incidentally, the load difference sensor 50 according to this embodiment is what is called a strain sensor, and is formed of an elastic material such as mild steel, stainless steel or aluminum. The amount of displacement generated in the deforming portion 55 extending between the outer peripheral frame portion 51 fixed on the chamber 20 and the central member 52 having mounted thereon the pressure receiving portions 71, 72 for receiving the pressure of the diaphragms 31, 32 is produced as an electrical signal representing the mechanical strain by a measuring unit (gauge unit) arranged on the deforming portion 55. Specifically, the fluid pressure difference generated by the orifice 40 is detected as an amount of displacement corresponding to the difference $\Delta P$ (kPa) of the loads exerted on the first diaphragm 31 and the second diaphragm 32, and by converting the magnitude of the displacement into an electrical signal I (mA), the flow rate (ml/min) is measured. Although the deforming portion 55, is made of crossing thin plates (see FIG. 2) in this embodiment, it is possible to make the deforming portion 55 of a full face plate.

The pressure receiving portions 71, 72, like the diaphragms 31, 32, are preferably formed of fluororesin such as polytetrafluoroethylene (PTFE resin) having a superior corrosion resistance. As described with reference to the third aspect of the invention, the displacement limiting members 61, 62 are arranged inside the pressure receiving portions 71, 72 conveniently from the viewpoint of both manufacture and configuration, while at the same time protecting the diaphragms 31, 32. Numerals 73, 74 designate recesses for mounting the coupling protrusions 53, 54 of the central member 52 of the load difference sensor 50. The pressure receiving portions 71, 72 may be formed integrally with the diaphragms 31, 32.

The displacement limiting members 61, 62 function as a stopper in the direction of displacement to prevent the diaphragms 31, 32 from being displaced by more than a predetermined amount. Any material can be employed as long as such a functional requirement can be met. According to this embodiment, the displacement limiting members 61, 62 are each formed of an annular metal member (FIG. 2) having the outer peripheral edge portions 63, 64 fitted on the outer peripheral frame portion 51 of the load difference sensor 50 and thus fixed on the chamber 20. The displacement limiting members can alternatively be provided against the fluid pressure fluctuations, on only one side.

The distance by which the displacement of the diaphragms 31, 32 is limited by the displacement limiting members 61, 62, i.e. a stopper gap a is determined taking the differential pressure sensitivity and the elastic limit of the diaphragms 31, 32 into consideration. For measuring the load up to about 3 kgf, the amount of displacement limitation of the diaphragms 31, 32, i.e. the stopper gap a is normally set to about 0.3 mm. A figure of 0.5 mm is employed in this embodiment.

The flow bypass 35, as shown, extends from a bypass entrance open to the primary chamber 21 to a bypass exit open to the secondary chamber 25, and an orifice (portion) 40 is interposed midway in the flow bypass 35. The orifice 40, as shown, may be an independent replaceable member, or may be formed integrally with the body 11 as required. The orifice 40 has a hole 41 of a predetermined diameter and is interposed in the flow bypass 35 thereby to cause a differential pressure.

The body 11, which is normally formed of a fluororesin such as polytetrafluoroethylene (PTFE resin) having a superior corrosion resistance to suit the applications thereof, may alternatively be formed of ordinary plastics or metal. The body 11, as shown, is comprised of a combination of half body members 11A and 11B (and an intermediate block, if necessary), which are integrally fastened by a mounting member not shown.

In FIG. 2, numerals S1, S2 designate lead wires for the measuring portion (gauge portion) G arranged on the deforming portion 55 of the load difference sensor 50. The lead wires are connected to an external display unit such as a voltmeter or an arithmetic processing unit such as a computer or any of various control units through notched grooves 12A, 12B of the body 11.

FIG. 3 shows an example in which the displacement limiting members 66, 67 are provided for the load difference sensor 50. In this case, the displacement limiting members 66, 67 each formed of an annular metal material similar to the one described above is arranged on the central member 52 of the load difference sensor 50. Numerals 68, 69 in FIG. 3 designate outer peripheral edge portions, which are fixed on the chamber 20 by being fitted on the outer peripheral frame portion 51 of the load difference sensor 50. As in the aforementioned case, the displacement limiting members can be provided against the pressure fluctuations of the fluid on only one side.

Figure 4:
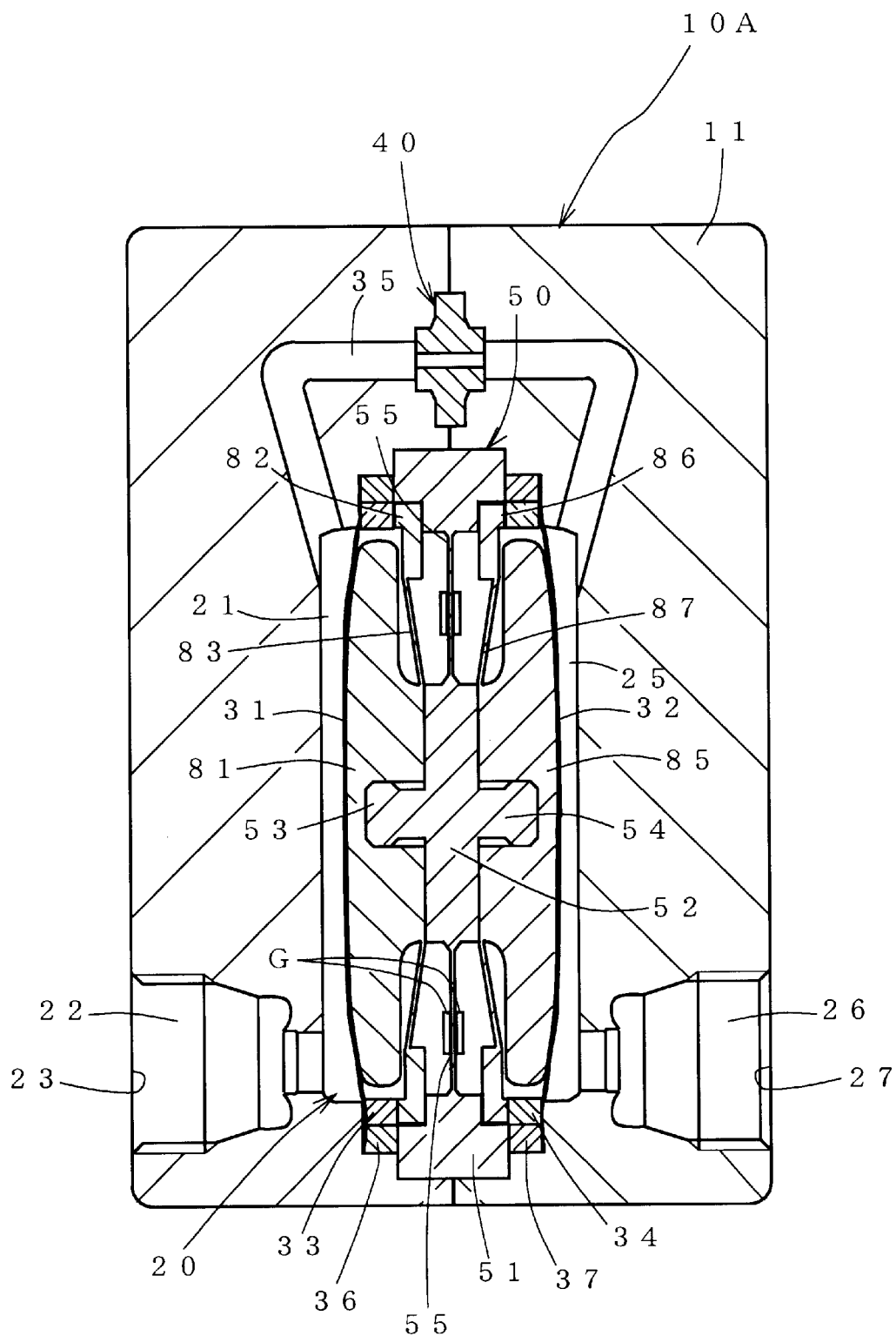
FIG. 4 is a longitudinal sectional view of a flow rate sensor according to a second embodiment of the invention.

Many fluids including hydrofluoric acid and ammonium water having a tendency to penetrate or permeate can be measured by a flow rate sensor 10 of this type. For this reason, like the flow rate sensors 10A, 10B, 10C described below and shown in FIGS. 4 to 6, a structure for protecting the measuring portion G of the load difference sensor is proposed. In the embodiments described below, the same component members shown in FIGS. 1 to 3 are designated by the same reference numerals, respectively, and will not be described again.

First, a flow rate sensor according to the fourth aspect of the invention, in which a protective diaphragm is formed outside the deforming portion including the measuring portion of the load difference sensor, is proposed. In the embodiment, as in the flow rate sensor 10A shown in FIG. 4, the pressure receiving portions 81, 85 and the displacement limiting members 82, 86 are coupled integrally to each other by protective diaphragm portions 83, 87. In this structure, the measuring portion G arranged on the deforming portion 55 of the load difference sensor 50 is entirely isolated from the fluid passing through the chambers 21, 25, by the protective diaphragms 83, 87 between the pressure receiving portions 81, 85 and the displacement limiting members 82, 86, thereby making it possible to prevent inconveniences which otherwise might be caused by a permeating gas or the like. The protective diaphragms 83, 87 have a plasticity like the deforming portion 55 of the load difference sensor 50, and therefore, may transmit the pressure fluctuations from the first diaphragm 31 and the second diaphragm 32.

Figure 5:
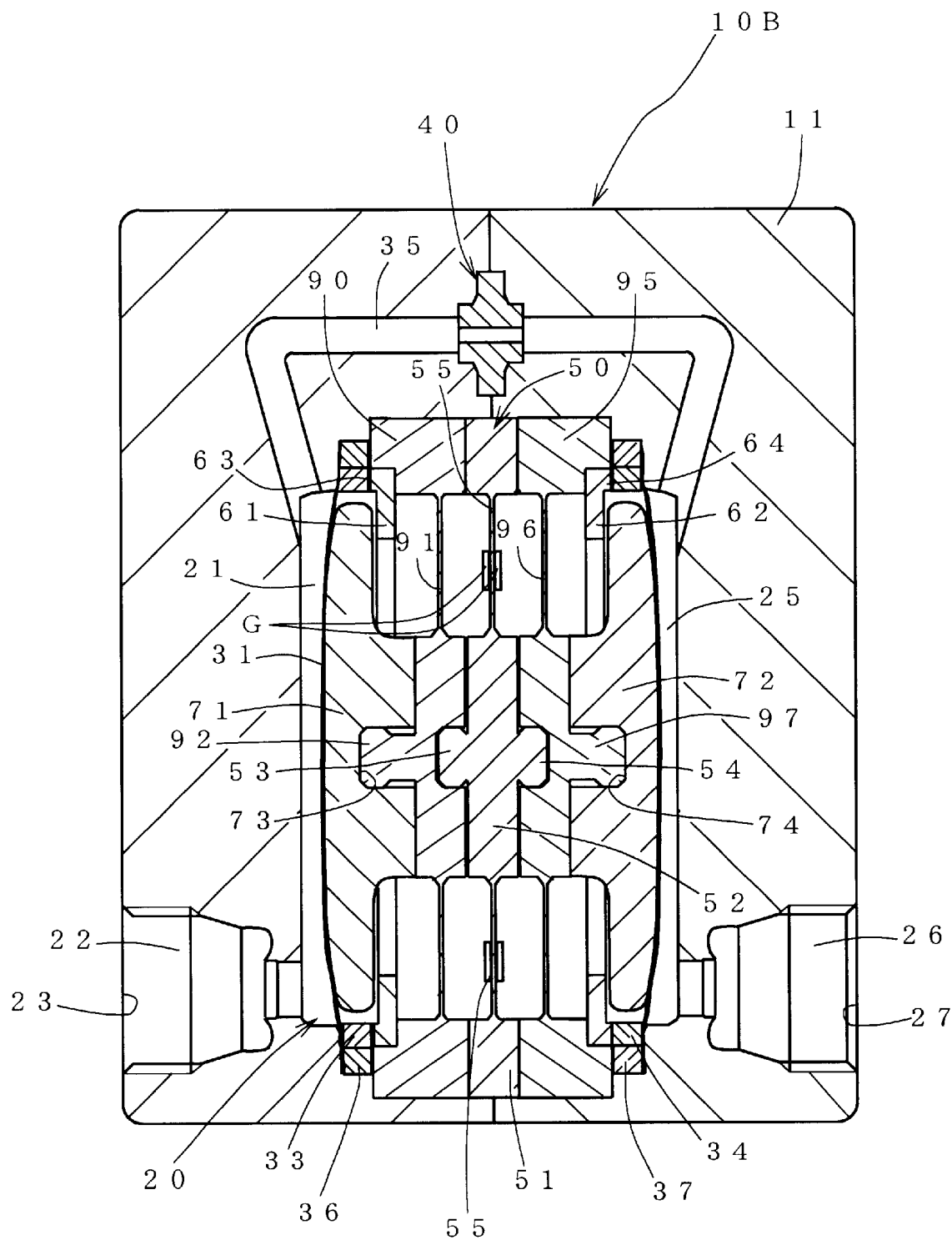
FIG. 5 is a longitudinal sectional view of a flow rate sensor according to a third embodiment of the invention.

The flow rate sensor 10B shown in FIG. 5, on the other hand, has the feature in that the load difference sensor body 50 is held on the two sides thereof by two wheel members 90, 95 having the protective diaphragms 91, 96. The wheel members 90, 95 include portions 92, 97 for fixing the central member 52 and the pressure receiving portions 71, 72 at the position of the central member 52, as well as the protective diaphragm portions 91, 96 at the position corresponding to the deforming portion 55 of the load difference sensor 50. As a result, the measuring portion G mounted on the deforming portion 55 of the load difference sensor 50, which is isolated from the chambers 21, 25 by the protective diaphragms 91, 96 of the wheel members 90, 95, can be protected on the two sides thereof from the gas or the like.

Figure 6:
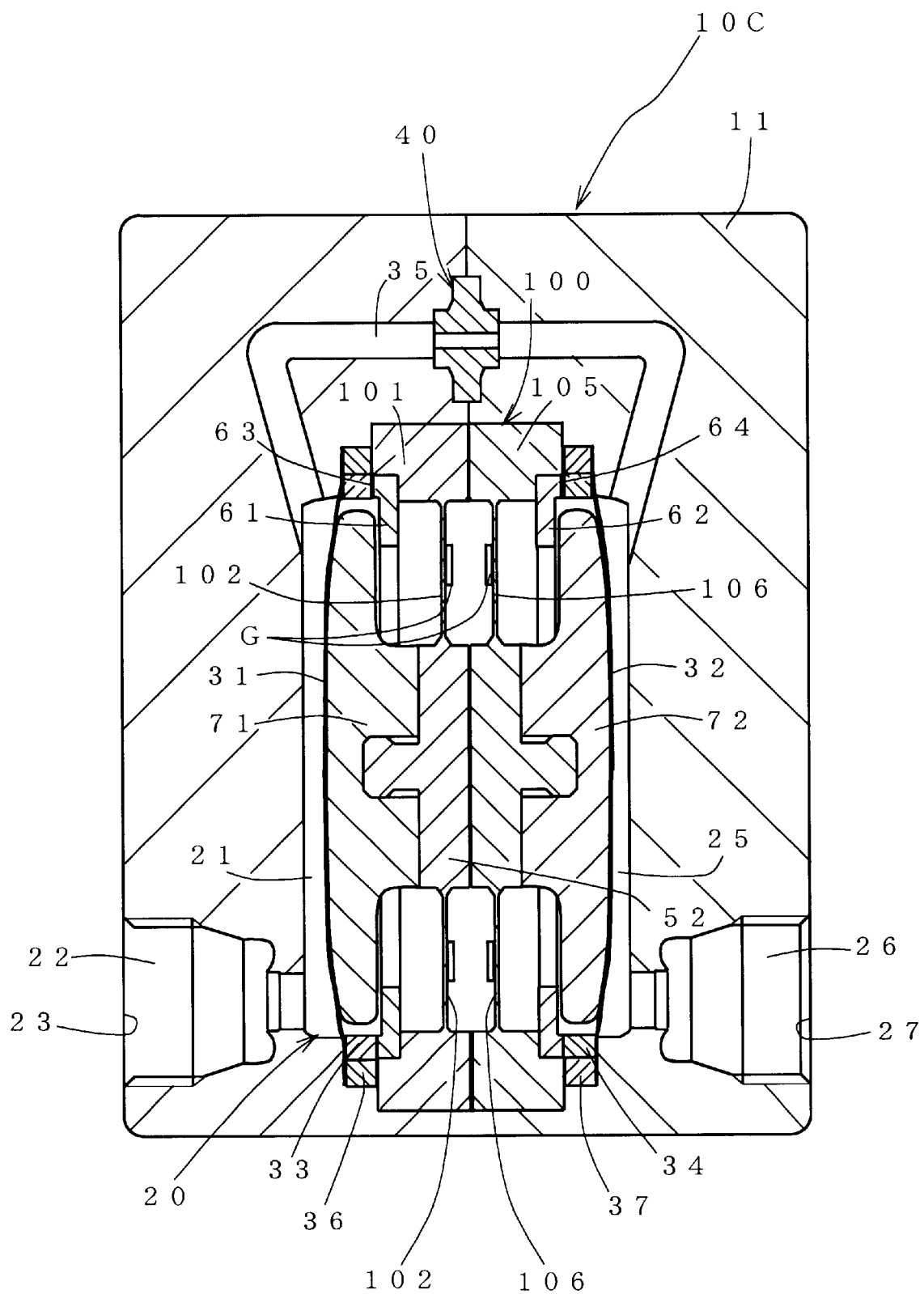
FIG. 6 is a longitudinal sectional view of a flow rate sensor according to a fourth embodiment of the invention.

Further, the flow rate sensor 10C according to the fifth aspect of the invention shown in FIG. 6 has the feature in that two deforming portions of the load difference sensor are formed in opposed relation to each other, and the measuring portion G is arranged on the inner surface side of each of the deforming portions. According to this embodiment, the load difference sensor 100 includes two members, i.e. a first member 101 and a second member 105. This load difference sensor 100 is configured of the first member 101 and the second member 105 arranged adjacently to each other with the measuring portion G mounted on the inner surface side of each of the deforming portions 102, 106, and thus can prevent the gas arising from the fluid flowing through the chambers 21, 25.

Figure 7:
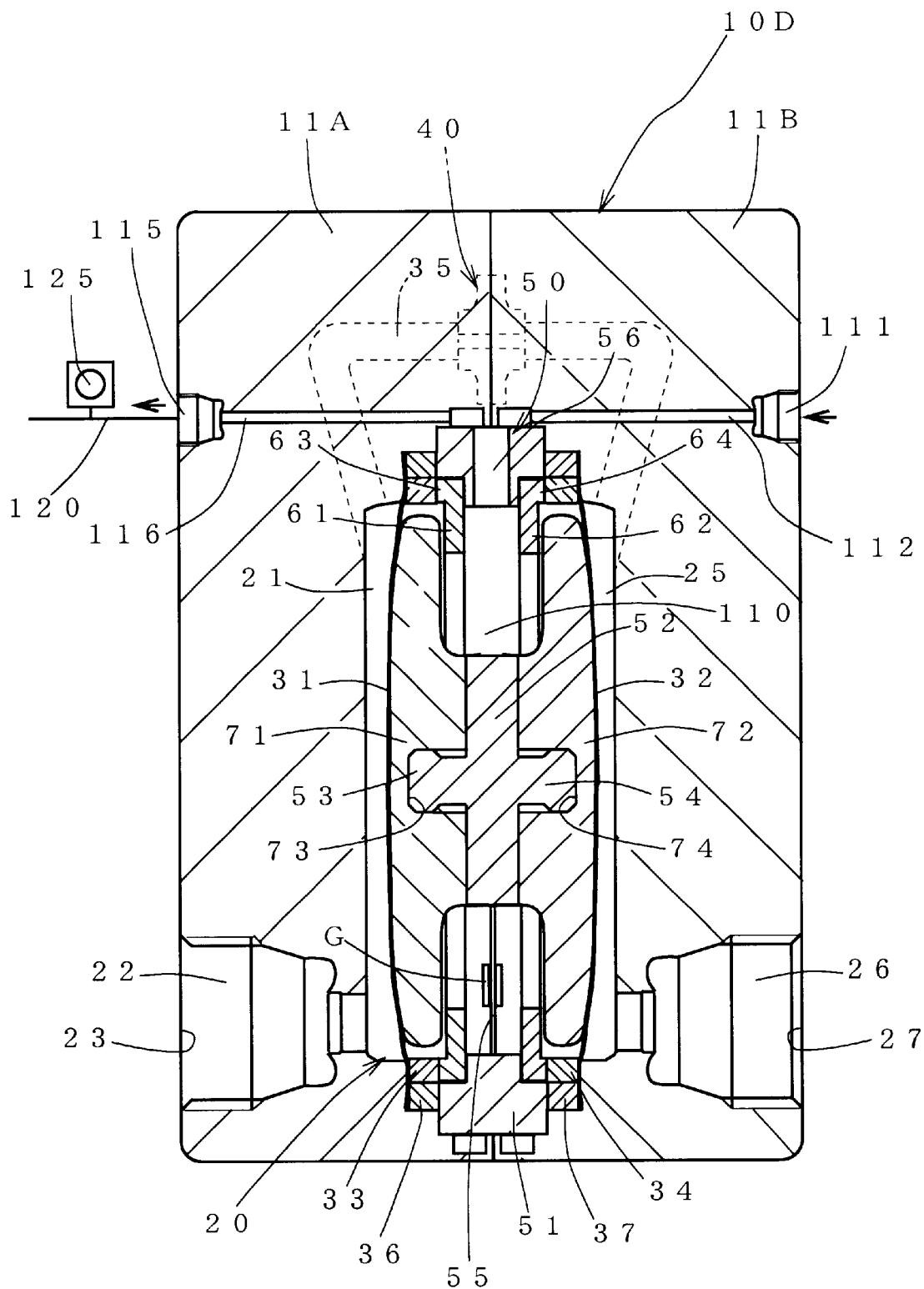
FIG. 7 is a longitudinal sectional view showing an embodiment in which the flow rate sensor includes a permeative gas discharge mechanism.

Furthermore, in the flow rate sensor 10D according to the sixth and seventh aspects of the invention shown in FIG. 7, the body has an inlet portion 111 and an outlet portion 115 for the purge gas in communication with the space 110 adjacent to the back sides of the diaphragms. In the presence of the permeative gas in the space 110 adjacent to the back sides of the diaphragms, the sensor measuring portion G is protected from the gas by discharging the permeative gas outside. According to this embodiment, a through hole 56 communicating with the inlet portion 111 and the outlet portion 115 of the purge gas is formed at a predetermined position of the outer peripheral frame 51 of the load difference sensor 50. Specifically, the purge gas (air, nitrogen gas, etc.) flows into the space 110 adjacent to the back sides of the diaphragms 31, 32 from the inlet portion 111 of the purge gas and flows out from the outlet portion 115 of the purge gas thereby to discharge the permeative gas in the space 110. According to this embodiment, as shown, the diaphragm 31 of the primary chamber 21 is shared with the space 110 adjacent to the back side of the diaphragm 32 of the secondary chamber 22. Therefore, the flow paths 112 and 116 from the inlet portion 111 and the outlet portion 115 of the purge gas are both connected with the through hole 56 of the outer peripheral frame 51 of the load difference sensor 50. Of course, these flow paths 112 and 116 may directly communicate with the space 110 adjacent to the back sides of the diaphragms 31, 32.

The permeative gas that has flowed out together with the purge gas from the outlet portion 115 of the purge gas is sent to a predetermined discharge destination outside the flow rate sensor 10 through the pipe 120, and is disposed of as required through a well-known disposal unit, not shown. As a result, the deterioration of the working environment and the air pollution of the surrounding environment can be prevented.

Further, as defined in the seventh aspect of the invention, means 125 for detecting the gas concentration or the liquid leakage may be arranged in the pipe 120 in the purge gas outlet portion 115. As a result, a change of the amount of the permeative gas and the liquid leakage in the space 110 adjacent to the back sides of the diaphragms 31, 32 can be detected. It is also possible to determine the passage of the controlled fluid and the condition of the diaphragm portion. A well-known equipment can be used as the means for detecting the gas concentration or the liquid leakage.

In the flow rate sensor 10 (10A, 10B, 10C, 10D) according to the embodiments described above, the pressure fluctuations of the fluid in the chambers 21, 25 are received and transmitted by the diaphragms 31, 32 to the pressure receiving portions 71, 72 (81, 85). The load generated by the pressure fluctuations received by the pressure receiving portions 71, 72 (81, 85) is detected as a difference of displacement by the measuring portion G of the deforming portion 55 (91, 96) of the load difference sensor 50 (100) thereby to detect the flow rate of the fluid. Also, even in the case of a large pressure fluctuation of the fluid which otherwise might displace the diaphragms 31, 32 to a considerable degree, the outer peripheral surfaces of the pressure receiving portions 71, 72 (81, 85) come into contact with the displacement limiting members 61, 62 (82, 86) and thus limit the displacement thereof. Therefore, the displacement is prevented from exceeding the measurable range of the diaphragms 31, 32 or the measurement ability of the load sensor 50 (100).

The fluid was measured using the flow rate sensor 10 (10A, 10B, 10C, 10D). In the case where the maximum differential pressure for measurement was set at 20 KPa, a measurement of 0.2 KPa (20 mmH$_2$O) was possible. In this measurement, the pressure resistance of 300 KPa could be secured, and the flow rate could be measured in the range of 50 ml/min to 5 ml/min.

Also, with this flow rate sensor 10 (10A, 10B, 10C, 10D), the. measurement is possible even with a small differential pressure between the primary chamber 21 and the secondary chamber 25. Thus, the diameter of the orifice 40 can be set to a large value, which in turn makes it possible to continuously measure even a fluid such as slurry for a semiconductor CMP which is liable to clog. In such a case, the flow rate range of 500 ml/min to 50 ml/min is measurable.

Figure 8:
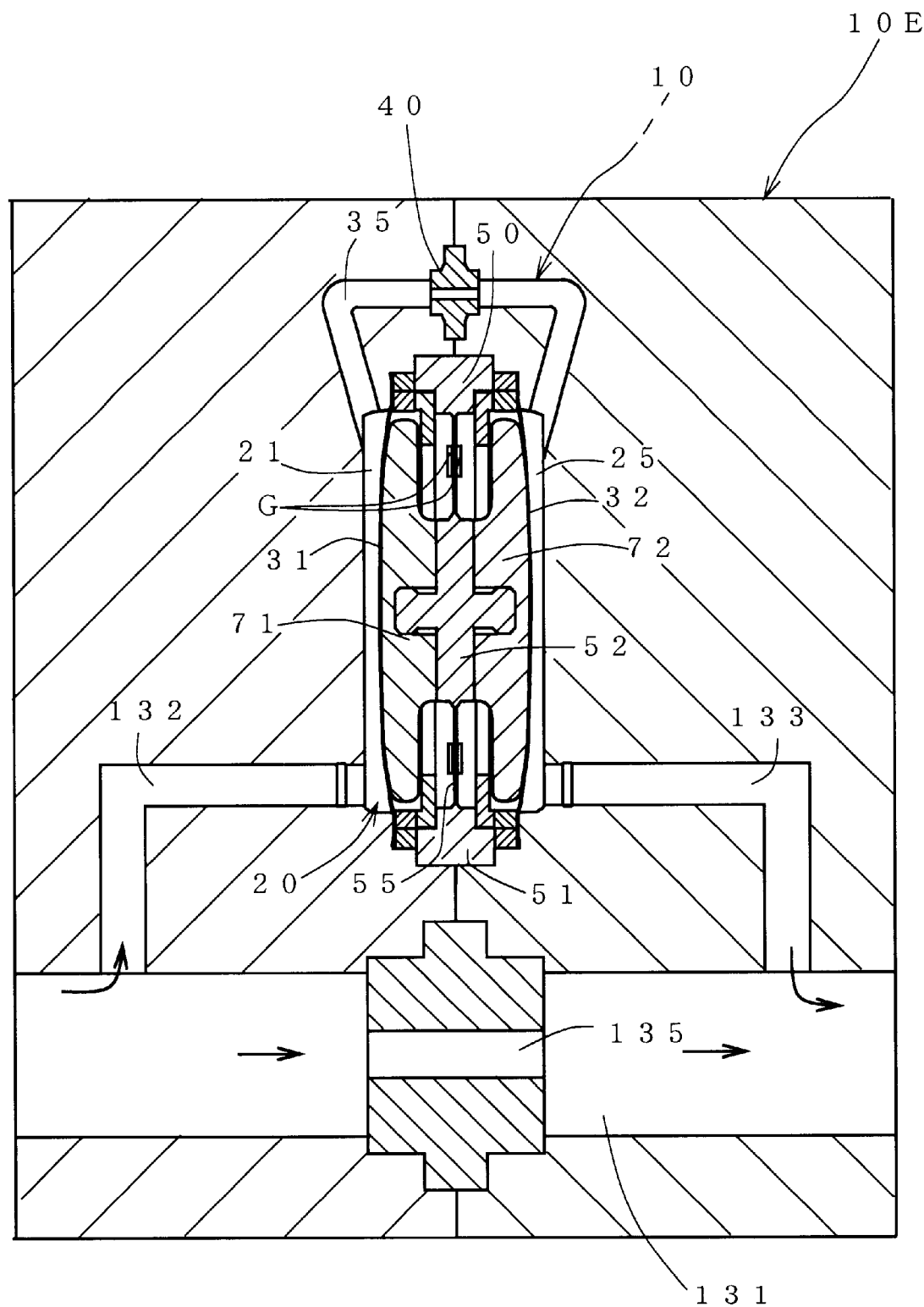
FIG. 8 is a sectional view schematically showing an embodiment in which the flow rate sensor measures a fluid of a large flow rate.
Figure 9:
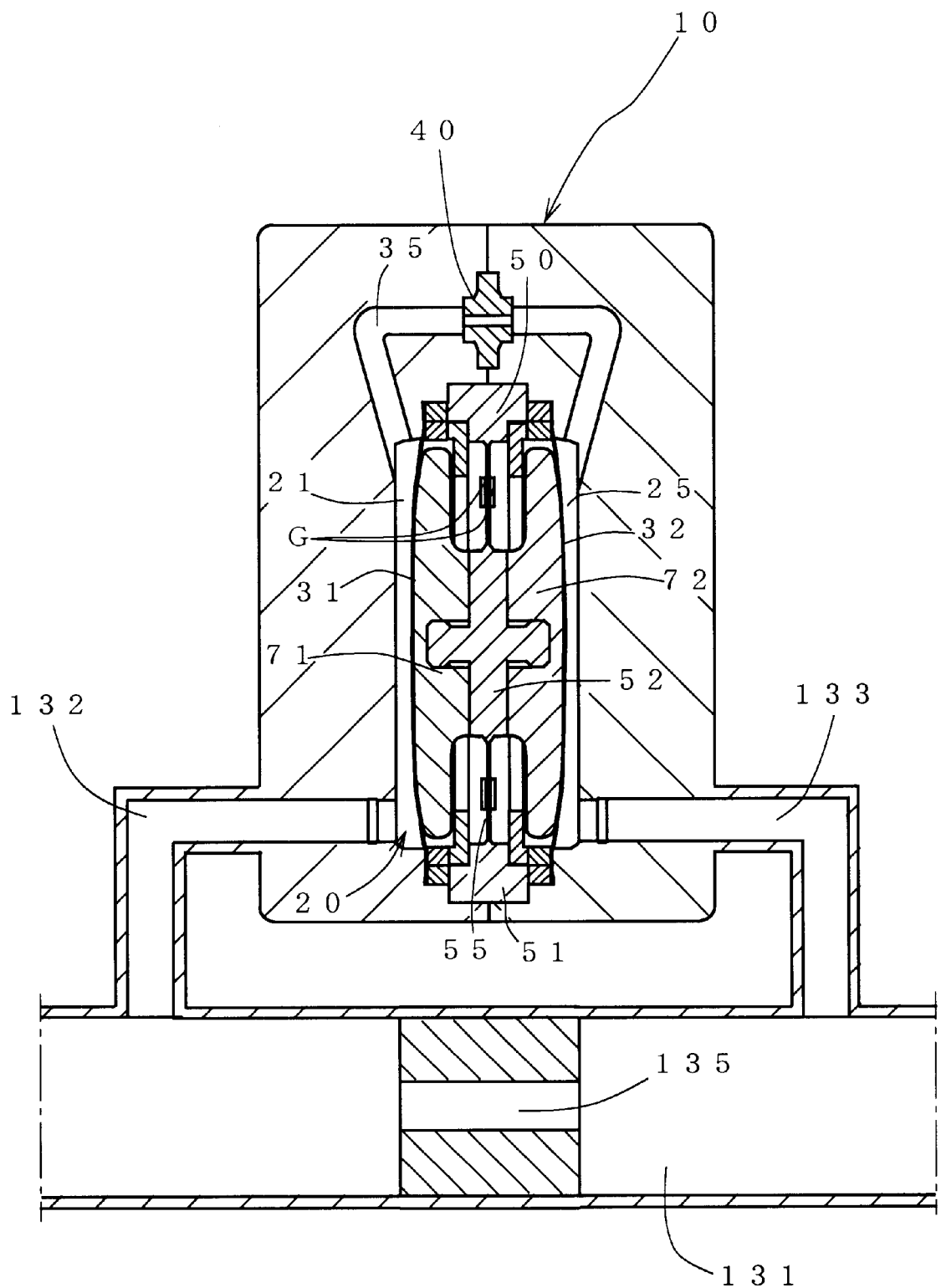
FIG. 9 is a sectional view schematically showing another embodiment in which for the flow rate sensor measures a fluid of large flow rate.

Furthermore, in the case where the fluid of large flow rate is measured, as in the flow rate sensor 10E shown in FIG. 8, a large-diameter orifice 135 is provided in the large-diameter pipe portion 131 and connected to the primary chamber 21 of the flow sensor 10 proper by the small-diameter pipe portion 132 branching from the large-diameter pipe portion 131, thereby making it possible to efficiently measure the fluid flow without any interruption. Also, according to this embodiment, in which the large-diameter pipe is built in the flow rate sensor 10E integrally, the large-diameter pipe portion 131 may be provided as an independent pipe as shown in FIG. 9, and the flow rate sensor 10 may be arranged nearby as a bypass with the small-diameter pipe portion 132.

As illustrated and described above, according to this invention, there is provided a flow rate sensor comprising displacement limiting members for the diaphragms or the load difference sensor, whereby the displacement caused by the fluid pressure fluctuations received by the first diaphragm and the second diaphragm is prevented from exceeding a predetermined amount. Therefore, a high fluid pressure resistance is maintained while at the same time improving the differential pressure sensitivity for flow rate measurement. As a result, measurement of a very small differential pressure, i.e. a very small flow rate (not higher than 10 ml/min) is made possible on the one hand, and the range of flow rate measurement can be increased (even a tenfold increase is easy) on the other hand.

Also, the flow rate sensor according to the invention has such a structure that the measuring portion of the load difference sensor is positively isolated or separated from the chamber. Even in the case where a fluid to be measured is hydrofluoric acid, ammonium water, etc. having a tendency to permeate or penetrate, therefore, the measuring portion of the flow rate sensor can be protected from the intruding gas.

What is claimed is:

1. A flow rate sensor comprising a chamber with first and second diaphragms arranged therein, in an opposed relation to each other, wherein said chamber is divided into a primary chamber facing said first diaphragm and a secondary chamber facing said second diaphragm, wherein a fluid is passed from said primary chamber to said secondary chamber through a bypass having an orifice member thereby to generate a differential pressure between said primary chamber and said secondary chamber, wherein the load difference generated by the fluid pressure fluctuations received by said first diaphragm and said second diaphragm is detected as a displacement by a load difference sensor arranged between said first diaphragm and said second diaphragm thereby to detect the flow rate of said fluid, and wherein a selected one of said diaphragm pair and said load difference sensor includes at least a displacement limiting member for preventing the displacement generated by the fluid pressure fluctuations received by said diaphragms from increasing beyond a predetermined amount.

2. A flow rate sensor according to claim 1, wherein said load difference sensor includes, fixedly arranged in said chamber, an outer peripheral frame member, a central member arranged at the central portion of said chamber, and a deforming portion, with a measuring portion, extending between said outer peripheral frame member and said central member, and wherein a pressure receiving portion for receiving the pressure of each of the diaphragms and transmitting the load thereof is mounted on said central member of said load difference sensor.

3. A flow rate sensor according to claim 2, wherein said displacement limiting member is arranged inside each of said pressure receiving portions.

4. A flow rate sensor according to claim 2 or 3, wherein a protective diaphragm portion is formed outside said deforming portion having said measuring portion of said load difference sensor.

5. A flow rate sensor according to claim 2 or 3, wherein said load difference sensor includes two deforming portions formed in opposed relation to each other and a measuring portion is arranged inside each of said deforming portions.

6. A flow rate sensor as described in claim 1, wherein the body of said flow rate sensor has an inlet portion and an outlet portion, for the purge gas, in communication with a space adjacent to the back sides of said diaphragms, so that permeative gas existing in the space adjacent to the back sides of said diaphragms can be discharged outside together with said purge gas passing therethrough.

7. A flow rate sensor as described in claim 6, wherein means for detecting a gas concentration or a liquid leakage is arranged in the piping system on the outlet portion side of said purge gas.

* * * * *

UNITED STATES PATENT AND TRADEMARK OFFICE
CERTIFICATE OF CORRECTION

PATENT NO.      : 6,640,650 B2
DATED           : November 4, 2003
INVENTOR(S)     : Hironori Matsuzawa et al.

It is certified that error appears in the above-identified patent and that said Letters Patent is hereby corrected as shown below:

<u>Title page, Item [54] and Column 1, line 1,</u>
Title, replace "FLOW RATE SENSOR" with -- DUAL-DIAPHRAGM DIFFERENTIAL PRESSURE FLOW RATE SENSOR --.

<u>Column 8,</u>
Line 55, "wherein a selected one of said diaphragm pair and said" should read -- wherein a selected one of said first and second diaphragms and said --.

Signed and Sealed this

Twenty-third Day of March, 2004

JON W. DUDAS
*Acting Director of the United States Patent and Trademark Office*